United States Patent
Ketsuka et al.

(10) Patent No.: US 11,379,159 B2
(45) Date of Patent: Jul. 5, 2022

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventors: Masakazu Ketsuka, Kanagawa (JP);
Ichiro Shiozaki, Kanagawa (JP);
Nobumi Kusano, Kanagawa (JP);
Naoki Mukai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 449 days.

(21) Appl. No.: 15/995,200

(22) Filed: Jun. 1, 2018

(65) Prior Publication Data
US 2018/0364952 A1 Dec. 20, 2018

(30) Foreign Application Priority Data
Jun. 16, 2017 (JP) .................. 2017-118843

(51) Int. Cl.
*G06F 3/12* (2006.01)
*G06F 3/0486* (2013.01)
(Continued)

(52) U.S. Cl.
CPC ......... *G06F 3/1204* (2013.01); *G03G 15/502* (2013.01); *G06F 3/0486* (2013.01);
(Continued)

(58) Field of Classification Search
CPC .. G06F 3/1204; G06F 3/04817; G06F 3/1205; G06F 3/0486; G06F 3/12; G03G 15/502
(Continued)

(56) References Cited

U.S. PATENT DOCUMENTS 7,757,180 B2 7/2010 Nakai et al.
2008/0174790 A1* 7/2008 Noguchi ............ H04N 1/32112
358/1.1
(Continued)

FOREIGN PATENT DOCUMENTS

JP 2001-337765 A 12/2001
JP 2013-186525 A 9/2013
(Continued)

OTHER PUBLICATIONS

Mar. 9, 2021 Office Action issued in Japanese Patent Application No. 2017-118843.
(Continued)

*Primary Examiner* — Darryl V Dottin
(74) *Attorney, Agent, or Firm* — Oliff PLC (57) ABSTRACT

An information processing device includes a reception unit, a generation unit, and a display control unit. The reception unit receives, for a screen on which a first instruction part for issuing an instruction to execute a first process for which a set value for a setting item is set and a second instruction part for issuing an instruction to execute a second process for which a set value for a setting item is set are displayed, a synthesizing operation for synthesizing the first instruction part and the second instruction part. The generation unit integrates, by the received synthesizing operation, the first process regarding the first instruction part and the second process regarding the second instruction part to generate a specific process. The display control unit performs control such that a specific instruction part for issuing an instruction to execute the specific process is displayed on the screen.

8 Claims, 10 Drawing Sheets

(51) Int. Cl.
    *G03G 15/00*     (2006.01)
    *G06F 3/04817*     (2022.01)

(52) U.S. Cl.
    CPC ........ *G06F 3/04817* (2013.01); *G06F 3/1205* (2013.01); *G06F 3/12* (2013.01)

(58) Field of Classification Search
    USPC ....................................................... 358/1.13
    See application file for complete search history.

(56) References Cited

U.S. PATENT DOCUMENTS

| | | | |
|---|---|---|---|
| 2013/0219341 A1 | 8/2013 | Lee et al. | |
| 2014/0181083 A1* | 6/2014 | Macho | G06F 3/04817 |
| | | | 707/722 |
| 2014/0288677 A1* | 9/2014 | Sato | G05B 19/409 |
| | | | 700/83 |
| 2014/0355021 A1 | 12/2014 | Kirihara | |
| 2015/0334254 A1* | 11/2015 | Kinoshita | G06F 3/0482 |
| | | | 358/1.15 |
| 2015/0370447 A1* | 12/2015 | Jitkoff | G06T 13/80 |
| | | | 715/835 |
| 2018/0115800 A1* | 4/2018 | Masuko | G06T 13/80 |
| 2018/0210616 A1* | 7/2018 | Shimada | G06F 3/0488 |

FOREIGN PATENT DOCUMENTS

| | | |
|---|---|---|
| JP | 2013-228900 A | 11/2013 |
| JP | 2014-182732 A | 9/2014 |
| JP | 2014-236418 A | 12/2014 |
| JP | 2016-066258 A | 4/2016 |
| JP | 2016-072792 A | 5/2016 |

OTHER PUBLICATIONS

Aug. 31, 2021 Office Action issued in Japanese Patent Application No. 2017-118843.

* cited by examiner

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-118843 filed Jun. 16, 2017.

BACKGROUND

Technical Field

The present invention relates to an information processing device and a non-transitory computer-readable medium.

SUMMARY

According to an aspect of the invention, there is provided an information processing device including a reception unit, a generation unit, and a display control unit. The reception unit receives, for a screen on which a first instruction part for issuing an instruction to execute a first process for which a set value for a setting item is set and a second instruction part for issuing an instruction to execute a second process for which a set value for a setting item is set are displayed, a synthesizing operation for synthesizing the first instruction part and the second instruction part. The generation unit integrates, by the received synthesizing operation, the first process regarding the first instruction part and the second process regarding the second instruction part to generate a specific process. The display control unit performs control such that a specific instruction part for issuing an instruction to execute the specific process is displayed on the screen.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described with reference to drawings. In the drawings, components including substantially the same functions will be referred to with the same reference signs, and redundant explanation will be omitted. Hereinafter, an image forming device will be described as an example of an information processing device. However, the information processing device is not limited to an image forming device.

Summary of Exemplary Embodiment

An information processing device according to an exemplary embodiment includes a reception unit that receives, for a screen on which a first instruction part for issuing an instruction to execute a first process for which a set value for a setting item is set and a second instruction part for issuing an instruction to execute a second process for which a set value for a setting item is set are displayed, a synthesizing operation for synthesizing the first instruction part and the second instruction part; a generation unit that integrates, by the received synthesizing operation, the first process regarding the first instruction part and the second process regarding the second instruction part to generate a specific process; and a display control unit that performs control such that a specific instruction part for issuing an instruction to execute the specific process is displayed on the screen.

The first process and the second process are functions such as, for example, copy, scanning, printing, facsimile communication, and electronic mail communication and a function of combination of some of the above functions.

In the first process and the second process that are to be integrated, set values for setting items required for execution of the corresponding processes, such as address information for facsimile communication, are set. Furthermore, the first process and the second process that are to be integrated are in a state in which they may be executed when the corresponding first instruction part and second instruction part are selected.

The specific process represents a process obtained by integrating the first process and the second process. The "integrated process" represents a process for continuously or concurrently executing the first process and the second process without the first process and the second process being executed separately. The first process and the second process that are integrated into a specific process include common processing contents. For example, scanning and facsimile communication include, as a common process contents, a process to read a reading target.

Furthermore, the integrated specific process may be executed such that a common process included in the first process and the second process is not executed redundantly. Specifically, the integrated specific process may be executed such that a result of the common process executed in the first process is used for execution of the second process and the common process in the second process is omitted, so that the common process is not executed redundantly. For example, a specific process obtained by integrating scanning and facsimile communication may be executed such that a result of document reading performed by scanning is used for execution of facsimile communication and the process to read the document in scanning is omitted, so that the process to read the document is not executed redundantly.

The instruction part is provided for issuing an instruction to execute a process in accordance with an operation by a user. The instruction part may be, for example, an icon that represents a function by a figure, a character or a symbol added to a figure representing a function, or only a character or a symbol.

The generation unit integrates the first process and the second process to generate a specific process when the first instruction part and the second instruction part are synthesized in accordance with an operation by a user. An operation for synthesizing the first instruction part and the second instruction part may be, for example, an operation for causing the first instruction part and the second instruction part to be superimposed on each other or an operation for touching both the first instruction part and the second instruction part. Furthermore, when the specific process is generated, a specific instruction part is displayed on the screen by the display control unit.

First Exemplary Embodiment

Figure 1:
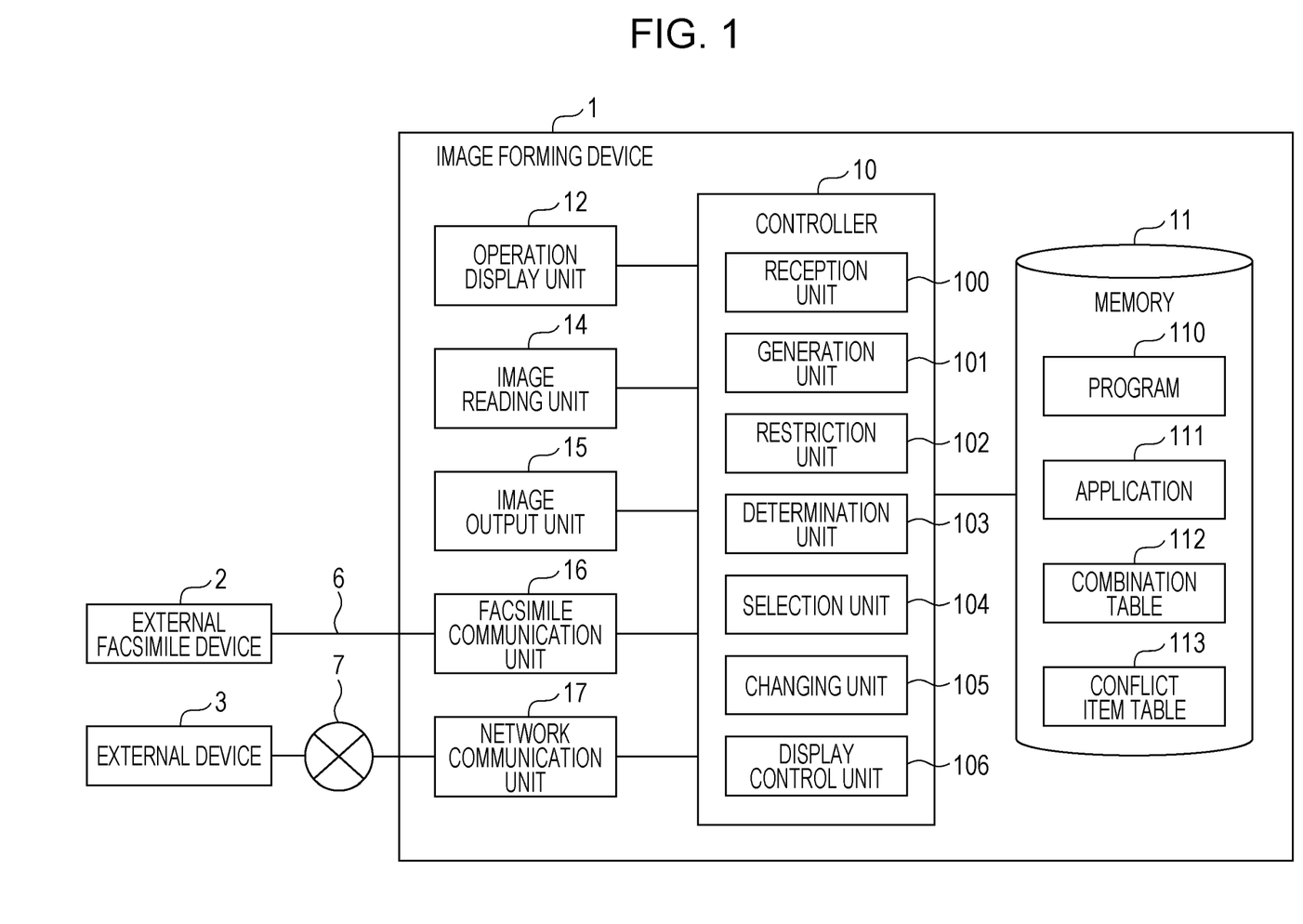
FIG. 1 is a block diagram illustrating an example of a control system of an image forming device according to a first exemplary embodiment of the present invention.

FIG. 1 is a block diagram illustrating an example of a control system of an image forming device according to a first exemplary embodiment of the present invention. An image forming device 1 is, for example, a multifunction device including plural functions such as a scan function, a printer function, a copy function, a facsimile function, an electronic mail function, and the like. The image forming device 1 includes at least two of the above-mentioned functions, and is not limited to a multifunction device.

The image forming device 1 includes a controller 10 that controls each unit of the image forming device 1, a memory 11 that stores various types of data, an operation display unit 12 that performs input and display of information, an image reading unit 14 that reads a document image from a document placed on a document table, which is not illustrated in FIG. 1, or a document supplied onto the document table from an auto document feeder, an image output unit 15 that prints and outputs an image, a facsimile communication unit 16 that performs facsimile transmission and reception to and from an external facsimile device 2 via a public network 6, and a network communication unit 17 that communicates with an external device 3 via a network 7.

In FIG. 1, one external facsimile device 2 and one external device 3 are illustrated. However, two or more external facsimile devices 2 or two or more external devices 3 may be provided.

The operation display unit 12 is, for example, a touch panel display, and includes a configuration in which a touch panel is arranged in a superimposing manner on a front side of a display such as a liquid crystal display.

The image reading unit 14 reads a document image from a document. The image reading unit 14 includes an auto document feeder provided on a document table and a scanner, and optically reads a document image from a document placed on the document table or a document sent by the auto document feeder.

The image output unit 15 prints and outputs a color image or a monochrome image to a recoding medium such as paper using, for example, an electrophotographic system or an inkjet system.

The facsimile communication unit 16 performs modulation and demodulation of data in accordance with a facsimile protocol such as G3, G4, or the like, and performs facsimile communication via the public network 6.

The network communication unit 17 transmits and receives signals to and from the external device 3 via the network 7. The external device 3 may be, for example, a personal computer, a server device, or the like.

The controller 10 includes a central processing unit (CPU), an interface, and the like. The CPU functions as a reception unit 100, a generation unit 101, a restriction unit 102, a determination unit 103, a selection unit 104, a changing unit 105, a display control unit 106, and the like by operating in accordance with a program 110 recorded in the memory 11. The details of the reception unit 100, the generation unit 101, the restriction unit 102, the determination unit 103, the selection unit 104, the changing unit 105, and the display control unit 106 will be described later. The controller 10 also functions as an execution unit that executes the above-mentioned functions by operating in accordance with an application 111 recorded in the memory 11.

The memory 11 includes a read only memory (ROM), a random access memory (RAM), a hard disk, and the like, and stores various types of data such as the program 110, the application 111, a combination table 112 (see FIG. 2), a conflict item table 113 (see FIG. 3), and the like.

The application 111 includes plural applications that execute processes such as copy, scanning, printing, facsimile communication, electronic mail communication, and the like. The application 111 includes a native application that executes a process (hereinafter, may also be referred to as a "native process") for which a set value (hereinafter, may also be referred to as a "parameter") for a setting item is not changed from a predetermined value and a customize application that executes a process (hereinafter, may also be referred to as a "customize process") for which a parameter is changed from a predetermined value to a value desired by a user.

The native process represents a process that is executed using an unchanged predetermined parameter. The customize process represents a process that is executed using a parameter changed from a predetermined value.

The customize application may be, for example, an application that executes scanning for which address information is set in advance by a user operation, an application that executes facsimile communication (hereinafter, may also be referred to as "quick fax") in which address information is set in advance by a user operation, or the like. The address information for scanning may be, for example, an IP address of the external device 3, a box provided in the memory 11 of the image forming device 1, or the like.

(Configuration of Combination Table)

Figure 2:
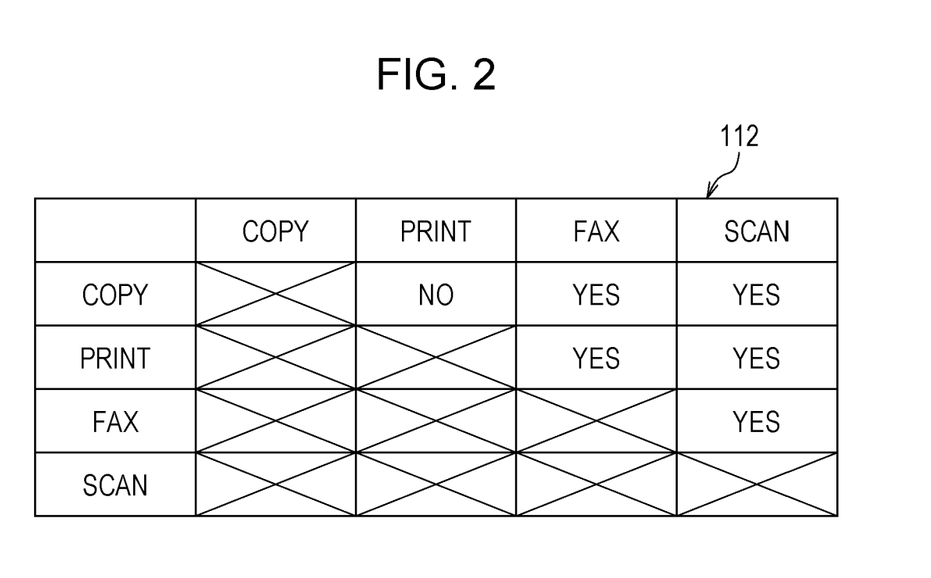
FIG. 2 is a diagram illustrating an example of a combination table.

FIG. 2 is a diagram illustrating an example of a combination table. In the combination table 112, information indicating whether or not plural processes included in the image forming device 1 may be integrated in terms of functionality is registered. As row fields and column fields of the combination table 112, fields for "copy", "print", "fax", and "scan" are provided.

In each cell of the combination table 112, information indicating whether or not processes such as copy, printing, facsimile communication, scanning, and the like may be integrated in terms of functionality is recorded. A state in which processes may be integrated in terms of functionality represents a state in which two or more different processes may be synthesized into one process and executed continuously or concurrently without being executed separately. This information includes, for example, "Yes" which represents a combination of processes that may be integrated, "No" which represents a combination of processes that may not be integrated, and the like. Hereinafter, the term "record" is used for a case where information is written into a table, and the term "store" is used for a case where information is written into a memory.

(Configuration of Conflict Item Table)

Figure 3:
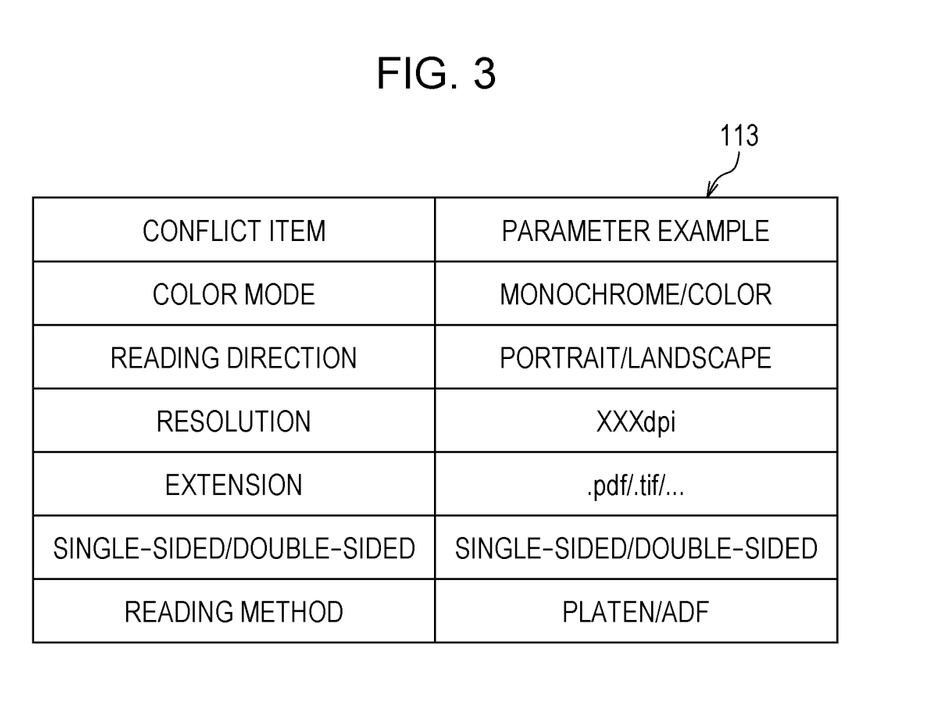
FIG. 3 is a diagram illustrating an example of a conflict item table.

FIG. 3 is a diagram illustrating an example of a conflict item table. The conflict item table 113 includes a "conflict item" field and an "parameter example" field.

In the case where different parameters are set for the same setting items in two or more processes that are to be executed continuously or concurrently, setting items that are not compatible to each other (hereinafter, may also be referred to as "conflict items") are recorded in the "conflict item" field. In the "parameter example" field, a list of setting examples of parameters for conflict items are provided.

The conflict items include, for example, a color mode, a reading direction, a resolution, a file extension, selection of single-sided or double-sided, a reading method, and the like.

The color mode is a setting item for determining a condition for color information for reading a document, and includes parameters such as, for example, "monochrome" and "color". The reading direction is a setting item representing the orientation of a document for reading a document, and includes parameters such as, for example, "portrait" representing an orientation in which long sides of a document are set to a longitudinal direction and "landscape" representing an orientation in which long sides of a document are set to a lateral direction. The extension is a setting item representing the type of a file of data of a read document, that is, the storage format of a file, and includes parameters such as, for example, "portable document format (pdf)" and "tagged image file format (tif)". The selection of single-sided or double-sided is a setting item representing whether only a single side of a document is to be read or both sides of the document are to be read. The reading method is a setting item for specifying a method for reading a document, and includes parameters such as, for example, "platen" representing a method for reading a document placed on a document table formed of platen glass or the like and having a flat shape and "auto document feeder (ADF)" representing a method for reading a document sent from an auto document feeder.

The reception unit 100 receives a user operation performed on a display screen of the operation display unit 12. User operations that may be received by the reception unit 100 include:

(a) an operation for moving an icon (hereinafter, may also be referred to as a "moving operation");

(b) an operation for synthesizing icons (hereinafter, may also be referred to as a "synthesizing operation");

(c) an operation for selecting a parameter of a conflict item (hereinafter, may also be referred to as a "selecting operation"); and (d) an operation for performing switching (hereinafter, may also be referred to as a "switching operation") as to whether to enable synthesis of icons in accordance with a synthesizing operation by the reception unit 100 (hereinafter, may also be referred to as an "editing mode") or disable synthesis of icons in accordance with a synthesizing operation by the reception unit 100 (hereinafter, may also be referred to as a "normal mode").

The editing mode is an example in which reception of a synthesizing operation by the image management system 100 is enabled.

Figure 4A:
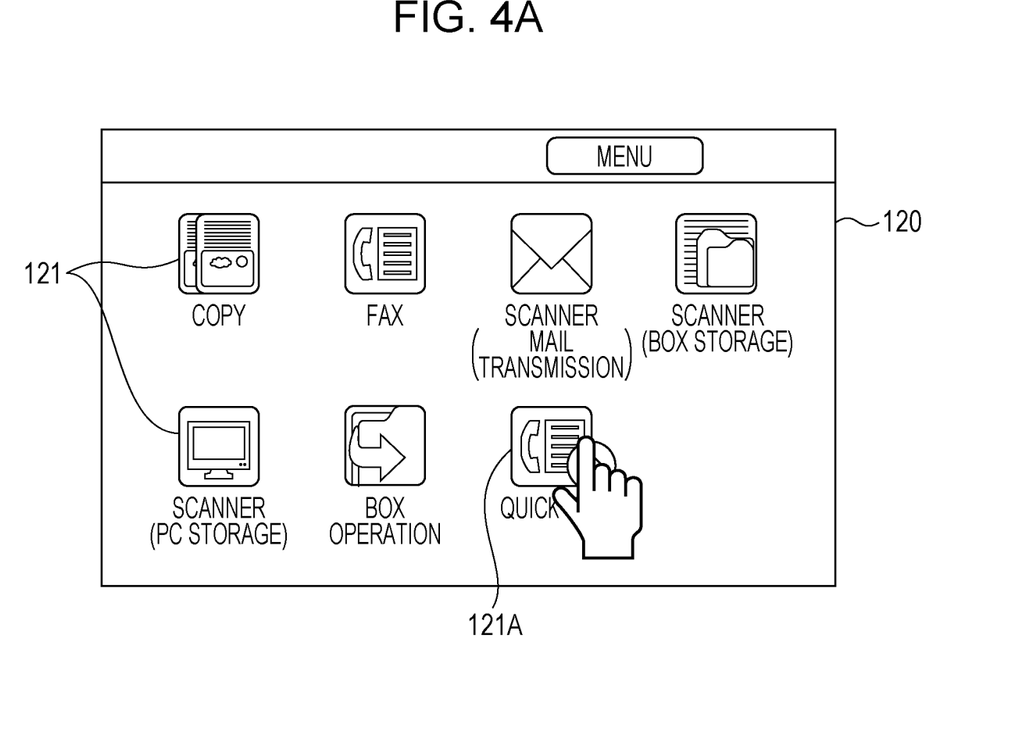
FIG. 4A is a diagram illustrating an example of a switching operation.
Figure 4B:
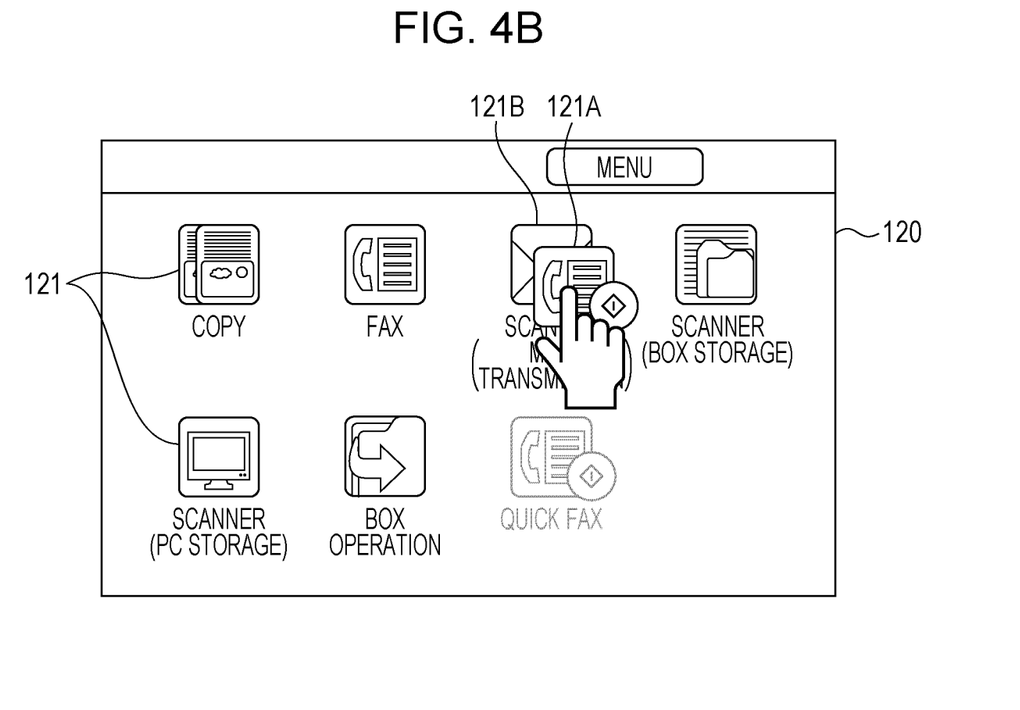
FIG. 4B is a diagram illustrating an example of a synthesizing operation.

FIG. 4A is a diagram illustrating an example of a switching operation. FIG. 4B is a diagram illustrating an example of a synthesizing operation. As illustrated in FIG. 4A, on the operation display unit 12, a menu screen 120 including icons 121 for issuing instructions to execute processes is displayed. On the menu screen 120, plural icons 121 are displayed. In FIG. 4A, on the menu screen 120, an icon for issuing an instruction to execute copying, an icon for issuing an instruction to execute facsimile communication, an icon for performing electronic mail transmission after scanning, an icon for storing a read file into the image forming device 1 (box) after scanning, an icon for storing a read file into a terminal device (PC) after scanning, an icon for the above-mentioned quick fax, and the like are displayed.

The switching operation is, for example, an operation for tapping a specific icon a predetermined number of times (for example, two to five times) or an operation for switching from the normal mode to the editing mode by an operation for continuously touching a specific icon for a predetermined time (for example, two to five seconds) or the like. For convenience of explanation, an example in which a switching operation is performed for an icon 121A will be described. However, the present invention is not limited to this. The switching operation may be performed for any of the icons 121. An icon is an example of an instruction part and a switching part.

A synthesizing operation is, for example, an operation for moving the two or more icons 121 relatively close to each other on the display screen of the operation display unit 12. A state in which "moving two or more icons relatively close to each other" represents a state in which the distance between the two or more icons 121 is set to a predetermined distance or less. In this case, part of an icon and part of another icon may be superimposed on each other or may not be superimposed on each other. Furthermore, regardless of the distance between the two or more icons 121, whenever the two or more icons 121 are relatively close to each other, the two or more icons 121 may be synthesized.

FIG. 4B illustrates a synthesizing operation for moving an icon 121A by dragging and causing the icon 121A to be superimposed on another icon 121B, with which the icon 121A is to be synthesized. As illustrated in FIG. 4B, when the distance between the two or more icons 121A and 121B has reached a predetermined distance or less, the reception unit 100 determines that the two or more icons 121A and 121B are superimposed on each other.

When the reception unit 100 receives a synthesizing operation in the editing mode, the generation unit 101 integrates processes associated with icons that are synthesized by the synthesizing operation to generate a specific process, and generates a specific icon for issuing an instruction to execute the generated specific process.

Processes that are to be integrated are processes for which parameters for setting items necessary for execution of the processes, such as address information for facsimile communication, are set. Furthermore, processes that are to be integrated are in a state in which the processes may be executed when corresponding icons 121 are selected.

For example, in the cases listed below, the restriction unit 102 restricts generation of a specific process by integration of processes even if the reception unit 100 receives a synthesizing operation. The list provided below is merely an example, and restriction of generation of a specific process by the restriction unit 102 is not limited to the cases described below.

(a) A case where creation is physically restricted on the system, that is, a case where creation is restricted regardless of the indication of a user's intention for creation. A case where creation is physically restricted on the system includes, for example, cases listed below:

(a1) a case where processes associated with icons for which a synthesizing operation is performed are not registered in the combination table 112 as a combination of processes that may be integrated in terms of functionality; and (a2) a case where the number of icons displayed on the display screen of the operation display unit 12 exceeds a predetermined upper limit number by generating a specific icon by the generation unit 101.

(b) A case where creation is restricted by a user or an administrator even if creation is physically possible on the system, that is, a case where a user or an administrator indicates in advance his or her intention not to create a specific icon. Specifically, for example, a case where setting is performed in advance such that integration of processes associated with icons for which a synthesizing operation is performed is not permitted is included; and (c) A case where a process associated with an icon may not be executed. Specifically, for example, a case where no parameter is set even though a process associated with an icon for which a synthesizing operation is performed requires setting for a parameter for a setting item, for example, a case where no address information is set for facsimile communication or scanning is included.

The determination unit 103 determines whether or not in the case where two or more icons are synthesized, a situation in which processes associated with the icons that are synthesized include a conflict item and there is no sameness between parameters of the conflict item (hereinafter, may also be referred to as a "functional conflict") occurs. A state in which "there is no sameness" represents a state in which different parameters are set for a conflict item.

The selection unit 104 rewrites a parameter in accordance with a selecting operation received by the reception unit 100.

The changing unit 105 performs a process for changing the currently set parameter into a predetermined parameter (hereinafter, may also be referred to as "auto merging"). The changing unit 105 may perform auto merging in the case where when a functional conflict occurs in processes associated with icons that are to be synthesized occurs, a conflict item for which different parameters are set is a setting item for which a user is not able to select a parameter.

A setting item for which a user is not able to select a parameter may be, for example, a color mode for a multifunction device including a facsimile function dedicated to monochrome. In this case, the facsimile function supports only monochrome. Therefore, in actuality, a user is not able to set the color mode of a setting item to "color", and is only able to set to "monochrome". For example, in the case where facsimile communication and scanning are integrated to generate a specific process, when the color mode, which is a setting item for scanning, is set to "color", the changing unit 105 performs auto merging for setting the parameter to "monochrome".

The display control unit 106 performs control such that an icon for issuing an instruction to execute a specific process generated by the generation unit 101 is displayed on the display screen of the operation display unit 12.

Figure 5A:
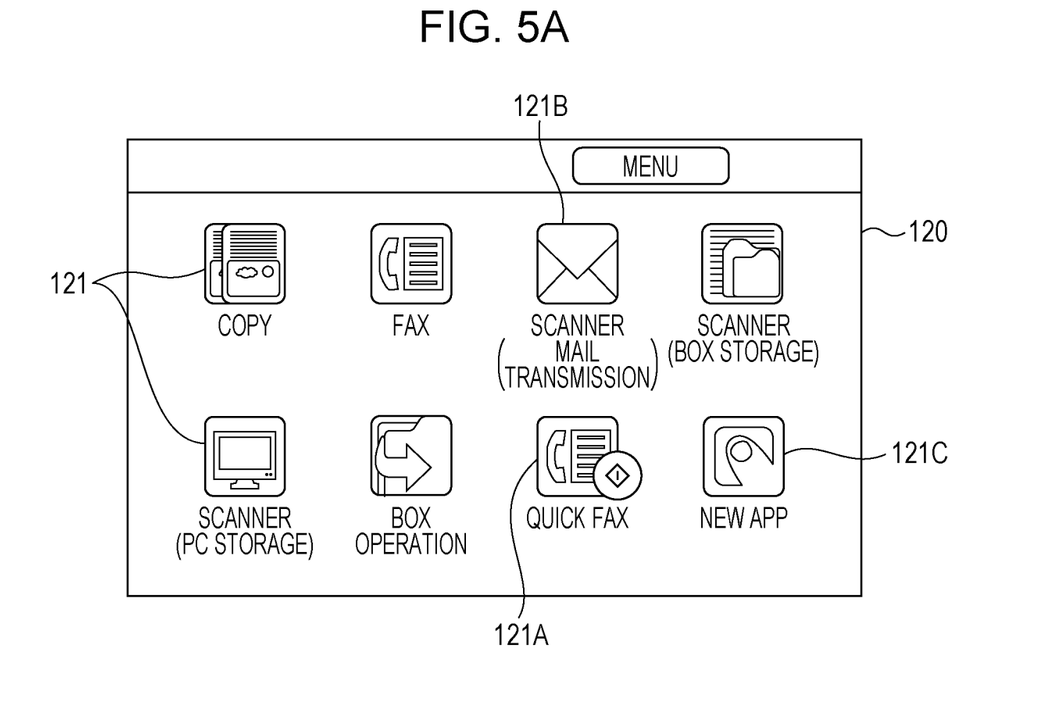
FIG. 5A is a diagram illustrating an example of display of generated icons in a case where synthesized icons are continuously displayed.
Figure 5B:
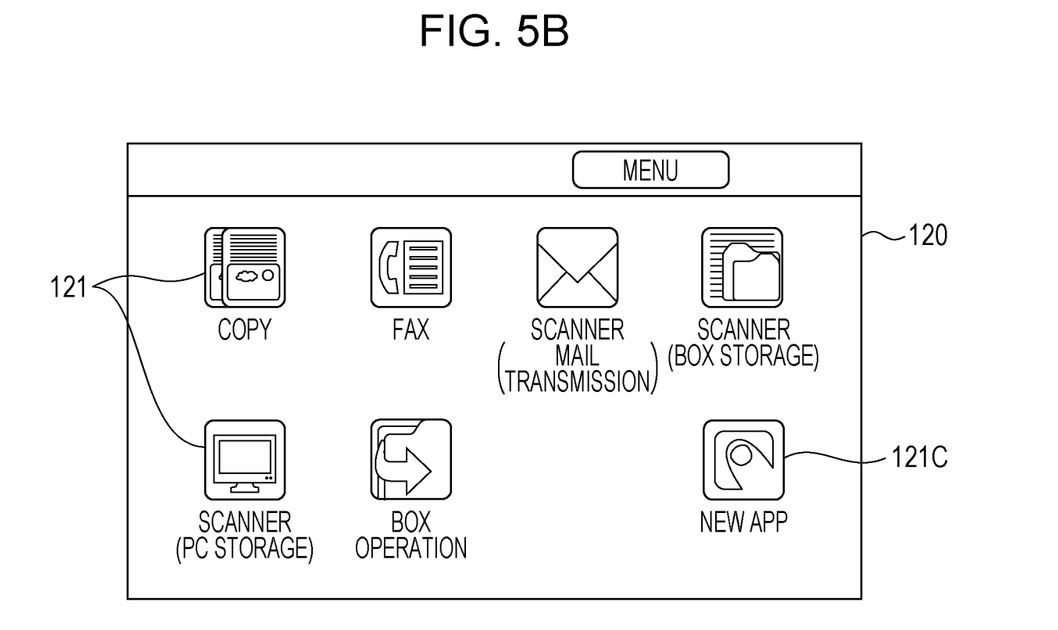
FIG. 5B is a diagram illustrating an example of display of generated icons in a case where one of synthesized icons is deleted.

FIGS. 5A and 5B are diagrams each illustrating an example of display of generated icons. FIG. 5A illustrates an example in which synthesized icons are continuously displayed, and FIG. 5B illustrates an example in which display is provided such that one of synthesized icons is deleted. As illustrated in FIG. 5A, the display control unit 106 performs control such that an icon 121C for issuing an instruction to execute a specific process (see characters "New App" in FIG. 5A) generated by a synthesizing operation for the icon 121A and the icon 121B is displayed.

Furthermore, as illustrated in FIG. 5B, the display control unit 106 may perform control such that the icon 121A, which is one of the synthesized icons, is deleted. For deletion of one of synthesized icons, the patterns described below may be included according to the process.

(1) Synthesis of icons for issuing instructions to execute customize processes:
 (a) both icons are continuously displayed,
 (b) only a dragged icon is deleted, and
 (c) both icons are deleted.

(2) Synthesis of an icon for issuing an instruction to execute a native process and an icon for issuing an instruction to execute a customize process:
 (a) both icons are continuously displayed, and
 (b) only an icon for issuing an instruction to execute a customize process is deleted.

(3) Synthesis of icons for issuing instructions to execute native processes:
 (a) both icons are continuously displayed.

Furthermore, when a specific process is generated by the generation unit 101, the display control unit 106 may display a message indicating that the specific process has been generated, such as, for example, "A specific process is obtained by synthesis.", on the display screen of the operation display unit 12.

Furthermore, in the case where integration of processes is restricted by the restriction unit 102, the display control unit 106 may perform control such that a message indicating that integration of processes has been restricted is displayed on the display screen of the operation display unit 12.

Furthermore, when a functional conflict occurs in processes associated with icons that are to be synthesized, in the case where a conflict item for which different parameters are set is a setting item for which a user is able to select a parameter, the display control unit 106 may perform control such that the selection unit 104 is displayed on the display screen of the operation display unit 12.

Figure 6:
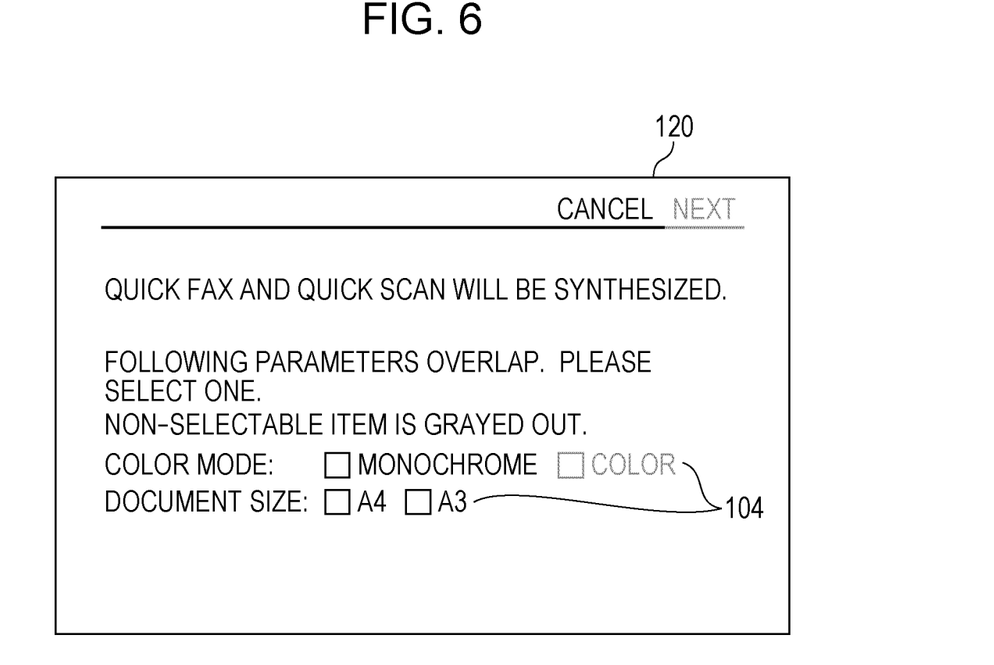
FIG. 6 is a diagram illustrating an example of display of a selection unit.

FIG. 6 is a diagram illustrating an example of display of a selection unit. As illustrated in FIG. 6, the selection unit 104 includes, for example, a list of parameters to be selected by a user and selection buttons or check boxes for the corresponding parameters. In the case where a parameter that a user is not able to select is provided, the display control unit 106 may perform control such that the parameter is displayed in a grayed-out state or the like so as to be distinguished from other parameters that the user is able to select.

Furthermore, the display control unit 106 may perform control such that a message for notifying a user that a process for which a parameter has been changed is generated is displayed on the display screen of the operation display unit 12 when the parameter is rewritten by the selection unit 104 or auto merging is performed by the changing unit 105.

For example, in the case where auto merging for setting a parameter for scanning to "monochrome" by the changing unit 105 is performed when facsimile communication and scanning are integrated to generate a specific process as described above, for example, a message "Synthesis is performed by setting the color mode to monochrome." may be displayed on the display screen of the operation display unit 12.

(Operation of First Exemplary Embodiment)

Figure 7:
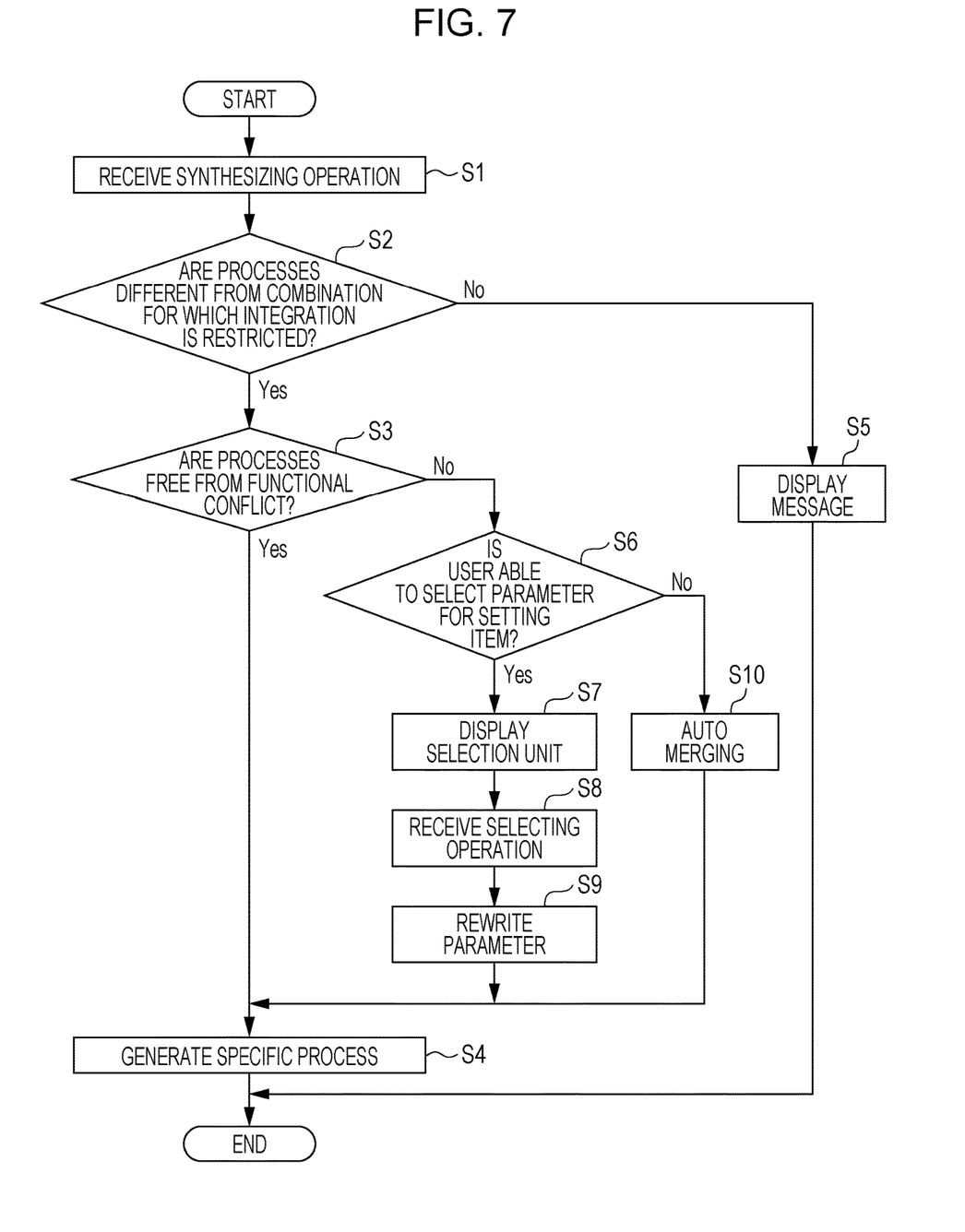
FIG. 7 is a flowchart illustrating an example of an operation of the image forming device according to the first exemplary embodiment.

Next, an example of an operation of the image forming device 1 according to the first exemplary embodiment will be described with reference to FIG. 7. FIG. 7 is a flowchart illustrating an example of an operation of the image forming device according to the first exemplary embodiment.

When the reception unit 100 receives a switching operation, the operation mode is changed from the normal mode to the editing mode. In the editing mode, control for receiving a synthesizing operation by the reception unit 100 is enabled. In the editing mode, when it is determined that two or more icons are superimposed on each other by a user operation, the reception unit 100 receives a synthesizing operation (S1).

Next, the restriction unit 102 determines whether or not processes associated with the icons for which the synthesizing operation has been performed are different from a combination for which integration is restricted (S2). In the case where the processes associated with the icons for which the synthesizing operation has been performed are different from a combination for which integration is restricted (S2: Yes), the determination unit 103 determines whether or not the processes associated with the icons for which the synthesizing operation has been performed are free from a functional conflict (S3). In the case where there is no functional conflict in the processes associated with the icons for which the synthesizing operation has been performed (S3: Yes), the generation unit 101 integrates the processes associated with the icons for which the synthesizing operation has been performed to generate a specific process (S4).

Next, the display control unit 106 performs control such that an icon for issuing an instruction to execute the specific process generated by the generation unit 101 is displayed on the display screen of the operation display unit 12.

In the case where the processes associated with the icons for which the synthesizing operation has been performed are a combination for which integration is restricted (S2: No), the restriction unit 102 restricts integration of the processes. In this case, the display control unit 106 performs control such that a message indicating that integration of the processes has been restricted is displayed on the display screen of the operation display unit 12 (S5).

When there is a functional conflict in the processes associated with the icons for which the synthesizing operation has been performed (S3: No), if a conflict item for which different parameters are set is a setting item for which a user is able to select a parameter (S6: Yes), the display control unit 106 performs control such that the selection unit 104 is displayed on the display screen of the operation display unit 12 (S7).

Next, the reception unit 100 receives a selecting operation by the user for the selection unit 104 displayed on the display screen of the operation display unit 12 (S8). Next, the selection unit 104 rewrites a parameter in accordance with the selecting operation by the user (S9).

In the case where the conflict item for which different parameters are set is not a setting item for which the user is able to select a parameter (S6: No), the changing unit 105 performs auto merging (S10).

The generation unit 101 generates a process in which a parameter has been rewritten by the selection unit 104 or a parameter has been changed by the changing unit 105 (S4). In the case where auto merging is performed by the changing unit 105, the display control unit 106 displays a message notifying the user that a parameter has been changed to a predetermined parameter on the display screen of the operation display unit 12.

With the operations described above, for execution of plural processes, an execution instruction may be performed with a small number of operation times compared to the case where instructions to execute the plural processes are issued separately.

<First Modification>

The first exemplary embodiment of the present invention has been described above. However, the present invention is not limited to the foregoing exemplary embodiment. Various modifications and implementations may be made without departing from the scope of the present invention. Specific modifications will be described below.

In the first exemplary embodiment, a switching operation is performed for the icons 121. However, a switching operation button for performing a switching operation may be provided, and the operation mode may be switched from the normal mode to the editing mode in accordance with an operation on the switching operation button by a user.

<Second Modification>

In the first exemplary embodiment, in the case where a conflict item for which different parameters are set is not a setting item for which a user is able to select a parameter (see step S6 in FIG. 7), the changing unit 105 performs auto merging (see step S10 in FIG. 7). However, auto merging may be performed without exception regardless of the setting item.

In the case where auto merging is performed without exception regardless of the setting item, the display control unit 106 may perform control such that a message such as, for example, "Processes are automatically merged. Please select a setting item below." is displayed. In the case where a functional conflict which requires a user to select a parameter is caused by integration of processes, the user may be prompted to select a parameter for which selection is required, while auto merging being performed.

Alternatively, in the case where a functional conflict occurs in processes associated with icons that are to be synthesized, auto merging may be prohibited without exception regardless of the setting item.

<Third Modification>

In the first exemplary embodiment, in the case where a functional conflict occurs in processes associated with icons that are to be synthesized, processes are performed by changing one of parameters to match the other parameter. However, processes may be performed without changing a parameter. For example, in the case where scanning and facsimile communication are integrated, when a parameter of a color mode for one of scanning and facsimile communication is "monochrome" and the other one is "color", a document may be read in color for both scanning and facsimile communication without changing a parameter and then change to monochrome may be performed according to the setting of a transmission destination.

<Fourth Modification>

Generation of a specific process described in the first exemplary embodiment may be performed for each user or the same settings may be performed for all users without distinguishing a specific user from the other users.

<Fifth Modification>

In the first exemplary embodiment, for superimposition of icons on each other in a synthesizing operation, the order of superimposition is not particularly limited. However, a master-slave relationship may be set for an icon which is superimposed on another icon and an icon on which another icon is superimposed. The master-slave relationship may be, for example, the relationship of an icon (slave icon) that is to be deleted from the menu screen 120 when synthesis is performed and an icon (master icon) that is to be continuously displayed or the relationship of an icon (master icon) that defines a principal part of design of the icon 121C to be generated and an icon (slave icon) that does not concern the principal part of design.

<Sixth Modification>

Figure 8A:
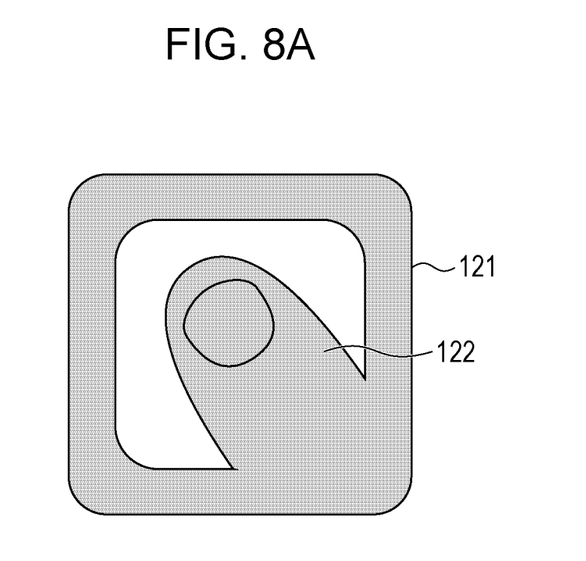
FIG. 8A is a diagram illustrating an example of display of generated icons in a case where a master icon is designed.
Figure 8B:
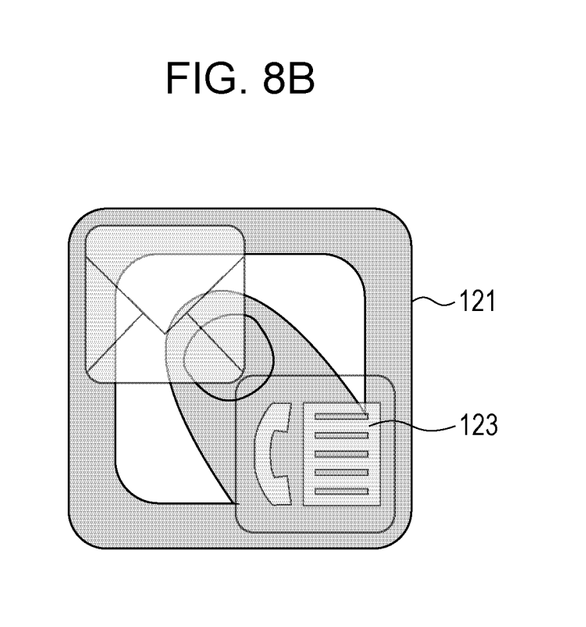
FIG. 8B is a diagram illustrating an example of display of generated icons in a case where a master icon is included.

FIGS. 8A and 8B are diagrams each illustrating display of generated icons. FIG. 8A illustrates an example in which a master icon is designed, and FIG. 8B illustrates an example in which a master icon is included. As illustrated in FIG. 8A, for example, a sign FIG. 122 having the shape of a thumb which allows a user to image a single action (one-touch operation, that is, a quick operation) may be used for the icon 121 generated by synthesizing an icon for issuing an instruction to execute scanning and an icon for issuing an instruction to execute quick fax. The icon 121C (see FIG. 5) generated by the generation unit 101 may include a design corresponding to a process obtained by synthesis.

Furthermore, as illustrated in FIG. 8B, an icon 123 indicating facsimile communication, which is a process to be combined with another process, may be included.

In FIGS. 8A and 8B, the icon 121 is illustrated in grayscale. However, the icon 121 may be illustrated in color. Furthermore, the icon 121 may be represented by gradation of color.

<Seventh Modification>

In the first exemplary embodiment, an operation for causing icons to be superimposed on each other in the editing mode is defined as a synthesizing operation. However, the synthesizing operation is not limited to an operation for causing icons to be superimposed on each other. For example, a synthesizing operation may be an operation for touching plural icons in the editing mode. This touching operation does not involve movement. In this case, the generation unit 101 integrates processes associated with plural icons for which a touching operation has been detected. Furthermore, the display control unit 106 may perform control such that the order in which icons are touched is displayed. The number of icons that are to be synthesized is not limited to two. Three or more icons may be synthesized. With a touching operation, in the case where three or more icons are to be synthesized, the icons may be synthesized easily compared to an operation for causing the icons to be superimposed on each other. Furthermore, a user is able to visually recognize the master-slave relationship or the synthesis order for synthesis.

<Eighth Modification>

A releasing unit that recovers an original icon before synthesis from an icon generated by synthesis may be provided.

<Ninth Modification>

Figure 9A:
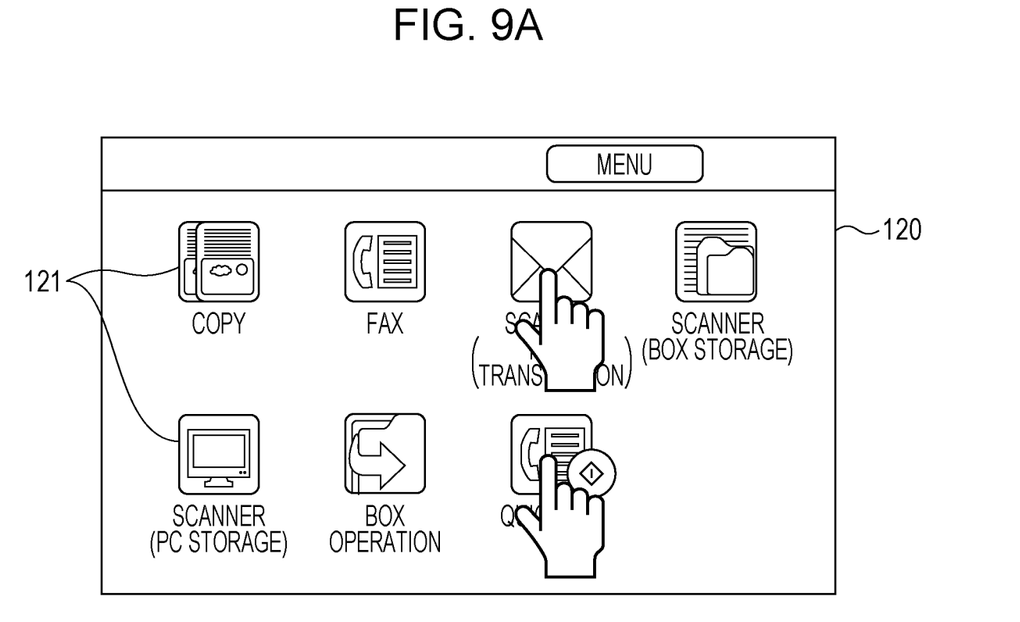
FIG. 9A is a diagram illustrating an example of a synthesizing operation according to a modification in a case where an operation for dragging an icon is performed.
Figure 9B:
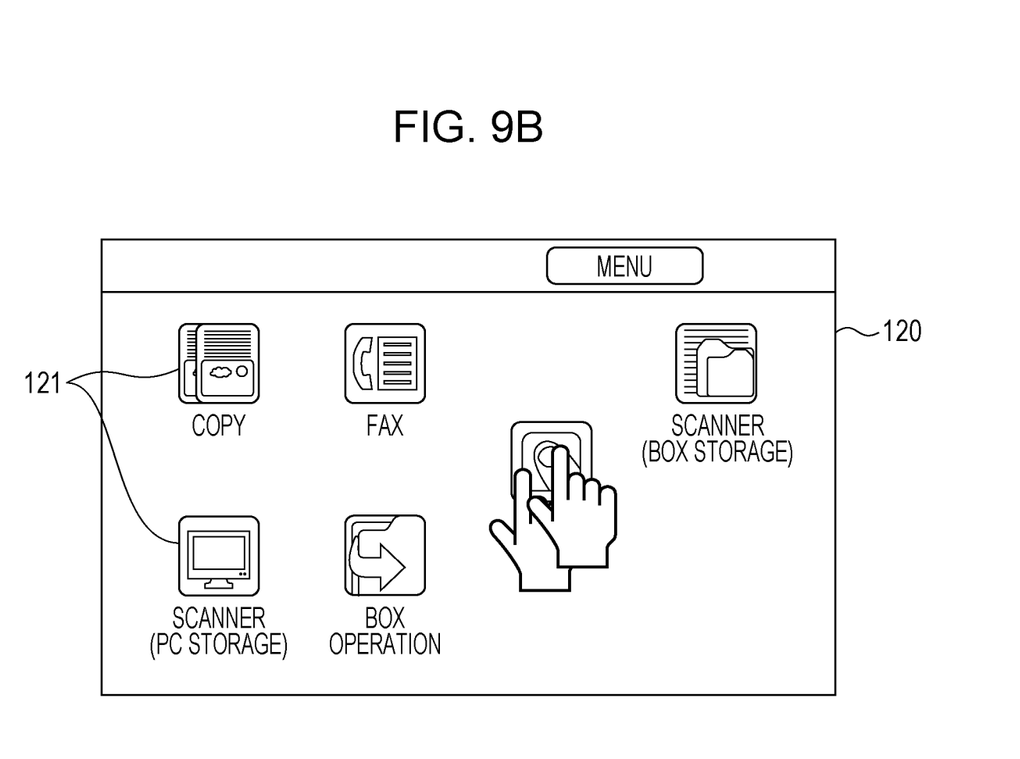
FIG. 9B is a diagram illustrating an example of a synthesizing operation according to a modification in a case where icons are synthesized.

FIGS. 9A and 9B are diagrams each illustrating an example of a synthesizing operation according to a modification. FIG. 9A illustrates an example of an operation for dragging an icon. FIG. 9B illustrates an example of synthesis of icons. In the first exemplary embodiment, as a synthesizing operation, an operation for dragging an icon and superimposing the icon on another icon in the editing mode has been explained. However, as illustrated in FIGS. 9A and 9B, all of the plural icons that are to be synthesized may be dragged and moved relatively close to each other.

<Tenth Modification>

Figure 10:
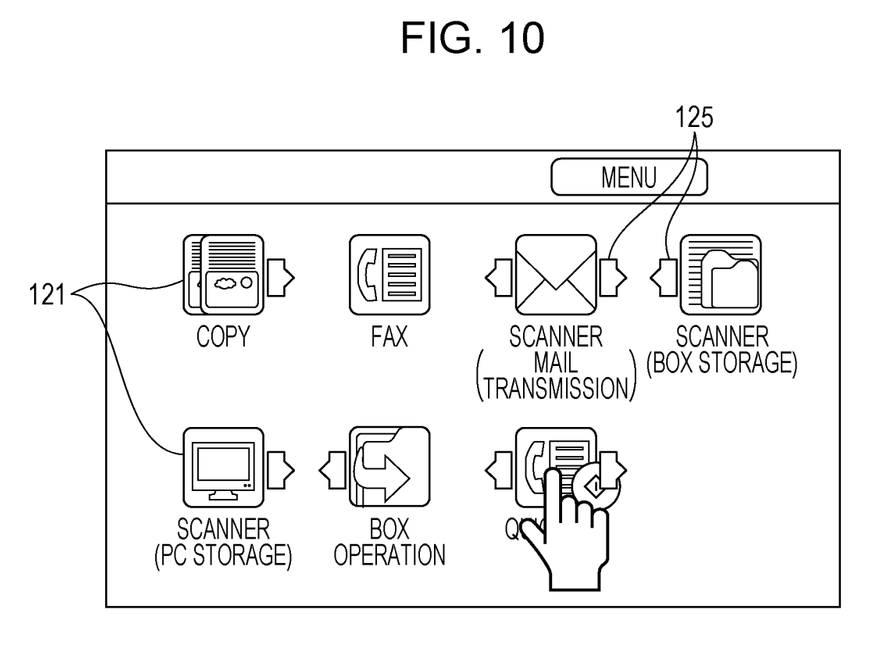
FIG. 10 is a diagram illustrating an example of a synthesizing operation according to a modification.

FIG. 10 is a diagram illustrating an example of a synthesizing operation according to a modification. In the editing mode, the display control unit 106 may perform control such that an icon that may be synthesized with another icon is displayed in a highlighted manner compared to an icon that may not be synthesized with another icon. In contrast, the display control unit 106 may perform control such that an icon that may not be synthesized with another icon is displayed in a highlighted manner compared to an icon that may be synthesized with another icon. An icon that may not be synthesized with another icon is an example of a third instruction part.

Specifically, in the editing mode, the display control unit 106 may perform control such that, as illustrated in FIG. 10, a connector 125 indicating that an icon may be synthesized with another icon is added to the icon and displayed. A state in which an icon may be synthesized with another icon represents a state in which integration of processes is not restricted by the restriction unit 102.

The connector 125 may indicate the master-slave relationship of icons to be synthesized or the order of synthesis. For example, an icon 121 on one side (for example, left side) of which the connector 125 is displayed may be defined as a master icon for synthesis, and an icon 121 on the other side (for example, right side) of which the connector 125 is displayed may be defined as a slave icon for synthesis.

Furthermore, the connector 125 may indicate the order of synthesis. For example, an icon 121 on one side of which the connector 125 is displayed may be defined as a slave icon for synthesis, and an icon 121 on both sides of which the connector 125 is displayed may be defined as a master icon for synthesis.

Furthermore, the display control unit 106 may perform control such that when the icon 121 is moved close to an icon that may be synthesized with another icon, the icon that the icon 121 is moved close to is displayed in a highlighted manner compared to other icons, for example, by flashing the connector 125.

Second Exemplary Embodiment

Figure 11:
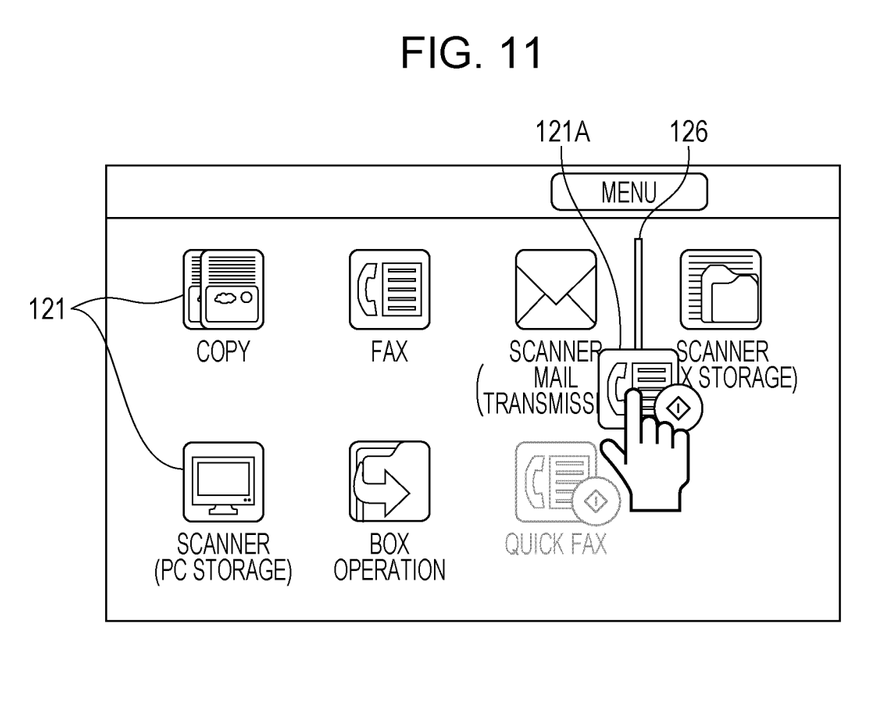
FIG. 11 is a diagram illustrating an example of a synthesizing operation according to a second exemplary embodiment.

FIG. 11 is a diagram illustrating an example of a synthesizing operation according to a second exemplary embodiment. In the first exemplary embodiment, the operation mode is changed from the normal mode to the editing mode by a switching operation. In the second exemplary embodiment, however, a switching operation is not required. In the explanation provided below, features different from the first exemplary embodiment will be focused on.

For example, synthesis by the generation unit 101 may be performed in the case where a predetermined time (for example, two to five seconds) has not passed since superimposition of the icons 121, and synthesis may not be performed in the case where the predetermined time or more has passed since superimposition of the icons 121. In this case, as illustrated in FIG. 11, after the predetermined time or more has passed since superimposition of the icons 121, the display control unit 106 may perform control such that a guide 126 indicating that a moving operation has been performed on the icon 121A is displayed. With this configuration, even without switching from the normal mode to the editing mode, both an icon synthesizing operation and an icon rearranging operation may be achieved.

Third Exemplary Embodiment

Figure 12A:
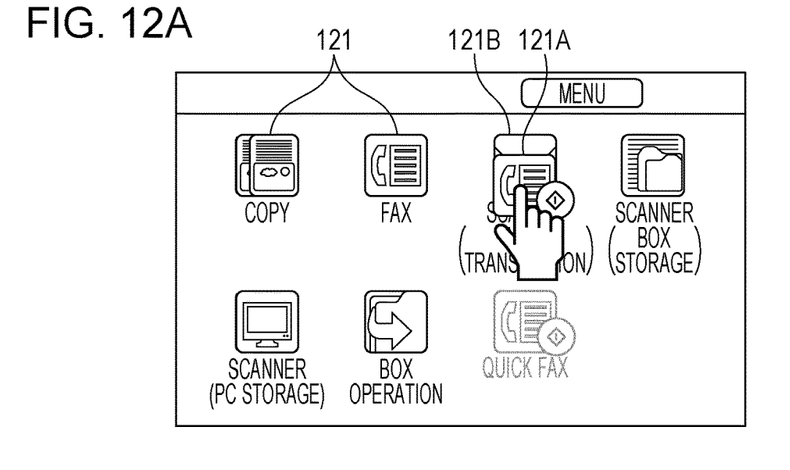
FIGS. 12A to 12C are diagrams each illustrating an example of a synthesizing operation according to a third exemplary embodiment.
Figure 12B:
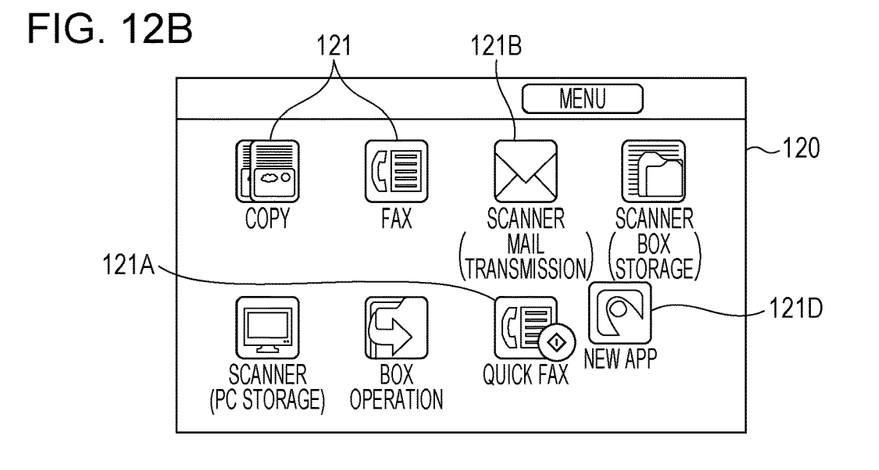
Figure 12C:
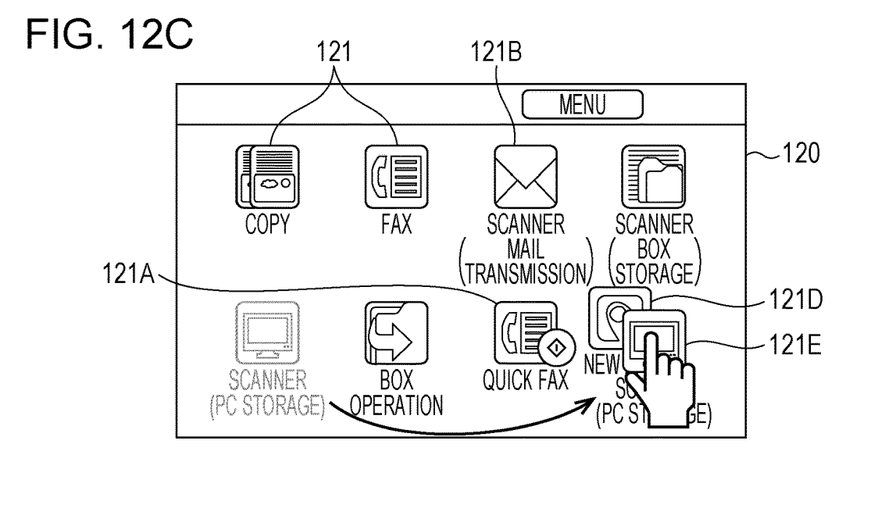

FIGS. 12A, 12B, and 12C are diagrams each illustrating an example of a synthesizing operation according to a third exemplary embodiment. In the third exemplary embodiment, three or more icons may be synthesized. For synthesis of three or more icons 121, first, a synthesizing operation may be performed for two of the three or more icons 121 to be synthesized, and the generation unit 101 may generate an intermediate icon as an intermediate product. In the explanation provided below, features different from the second exemplary embodiment will be focused on.

An example in which three icons: an icon for issuing an instruction to execute quick fax, an icon for issuing an instruction to execute mail transmission scanner, and an icon for issuing an instruction to execute PC storage scanner, are synthesized will be explained. As illustrated in FIG. 12A, a user performs a synthesizing operation for synthesizing the icon 121A for issuing an instruction to execute quick fax and the icon 121B for issuing an instruction to execute mail transmission scanner. The generation unit 101 generates, as illustrated in FIG. 12B, an intermediate icon 121D for issuing an instruction to execute a specific process generated by integration of the quick fax and the mail transmission scanner.

Next, as illustrated in FIG. 12C, the user performs a synthesizing operation for synthesizing the intermediate icon 121D and an icon 121E for issuing an instruction to execute PC storage scanner. Then, the generation unit 101 integrates the three processes to generate a specific process.

<Modification>

In the first exemplary embodiment, modifications of the first exemplary embodiment, the second exemplary embodiment, and the third exemplary embodiment, for superimposition of icons, the determination unit 103 determines whether or not a functional conflict occurs. However, the determination is not necessarily performed at this timing. For example, the determination may be performed when the operation mode is changed from the editing mode to the normal mode.

The exemplary embodiments of the present invention have been described above. However, exemplary embodiments of the present invention are not limited to the exemplary embodiments described above. Various modifications and implementation may be made without departing from the scope of the present invention.

Each of the units of the controller 10 may be partly or entirely configured by a hardware circuit such as field programmable gate array (FPGA) or an application specific integrated circuit (ASIC).

Part of components of the foregoing exemplary embodiments may be omitted or changed without departing from the scope of the present invention. Furthermore, addition, deletion, change, replacement, or the like of steps in a flow of the foregoing exemplary embodiments may be made without departing from the scope of the present invention. Furthermore, a program used in the foregoing exemplary embodiments may be recorded in a computer-readable recording medium such as a compact disc-read only memory (CD-ROM) or the like and supplied or may be stored in an external server such as a cloud server and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
at least one processor programmed to:
control a display to display a first icon for issuing an instruction to execute a first function;
control the display to display a second icon for issuing an instruction to execute a second function;
execute the first function in response to a first touch operation by a user;
execute the second function in response to a second touch operation by the user;
integrate the first function and the second function to generate a specific function in response to a third touch operation by the user, wherein the third touch operation includes (i) moving the first icon and the second icon closer to each other by a moving operation; or (ii) touching the first icon and the second icon, without moving them, by touching operations;
control the display to display a specific icon for issuing an instruction to execute the specific function; and
control the display to not display at least one of the first icon and the second icon when the specific icon is displayed, with the condition that the display is controlled so that the first icon is displayed when the specific icon is displayed if the first function is a process that is executed using an unchanged predetermined parameter and the second function is a process that is executed using a parameter that is changed from a predetermined value.

2. The information processing device according to claim 1,
wherein the first function and the second function include processing contents that are common to both the first function and the second function, and
wherein, the at least one processor is programmed so that, in executing the specific function, the first function and the second function are executed such that the processing contents common to both the first function and the second function are not executed redundantly.

3. The information processing device according to claim 2, wherein the at least one processor is configured to:
restrict generation of the specific function based on the third touch operation in a case where there is no sameness between set values of the first and second functions for a setting item relating to at least one of the processing contents that are common to the first function and the second function.

4. The information processing device according to claim 3,
wherein in a case where generation of the specific function is restricted, the at least one processor is programmed to control the display to display the set values such that the set values are able to be changed.

5. The information processing device according to claim 1, wherein the at least one processor is programmed to:
receive a switching instruction as to whether or not to enable integrating the first and second functions.

6. The information processing device according to claim 1,
wherein the at least one processor is programmed to control the display such that the first icon and the second icon, which issue instructions for executing functions that are able to be integrated, are displayed in a highlighted manner compared to a third icon for issuing an instruction to execute a process that is not able to be integrated with other processes.

7. A non-transitory computer readable medium storing a program causing a computer to execute a process for information processing, the process comprising:
displaying a first icon for issuing an instruction to execute a first function;
displaying a second icon for issuing an instruction to execute a second function;
executing the first function in response to a first touch operation by a user;
executing the second function in response to a second touch operation by the user;
integrating the first function and the second function to generate a specific function in response to a third touch operation by the user, wherein the third touch operation includes (i) moving the first icon and the second icon closer to each other by a moving operation; or (ii) touching the first icon and the second icon, without moving them, by touching operations; and
displaying a specific icon for issuing an instruction to execute the specific function, and not displaying at least one of the first icon and the second icon when the specific icon is displayed, with the condition that the first icon is displayed when the specific icon is displayed if the first function is a process that is executed using an unchanged predetermined parameter and the second function is a process that is executed using a parameter that is changed from a predetermined value.

8. An information processing device comprising:
at least one processor programmed to:
control a display to display a first icon for issuing an instruction to execute a first function;
control the display to display a second icon for issuing an instruction to execute a second function;
execute the first function in response to a first touch operation by a user;
execute the second function in response to a second touch operation by the user;
integrate the first function and the second function to generate a specific function in response to a third touch operation by the user, wherein the third touch operation includes (i) moving the first icon and the second icon closer to each other by a moving operation; or (ii) touching the first icon and the second icon, without moving them, by touching operations;
control the display to display a specific icon for issuing an instruction to execute the specific function; and
control the display to not display at least one of the first icon and the second icon when the specific icon is displayed, with the condition that the display is controlled to not display the second icon when the specific icon is displayed if the first function is a process that is executed using an unchanged predetermined parameter and the second function is a process that is executed using a parameter that is changed from a predetermined value.

* * * * *